United States Patent [19]

Clark et al.

[11] Patent Number: 5,443,125
[45] Date of Patent: Aug. 22, 1995

[54] SCRAPER FOR PLANTING MECHANISM GAUGE WHEEL

[75] Inventors: Richard H. Clark, Geneseo; Steven G. Gray, Lynn Center, both of Ill.; John D. Long, Ankeny, Iowa

[73] Assignee: Deere & Company, Moline, Ill.

[21] Appl. No.: 236,315

[22] Filed: May 2, 1994

[51] Int. Cl.⁶ ............................................. A01B 23/00
[52] U.S. Cl. ................................. 172/608; 172/559; 280/855; 15/256.5
[58] Field of Search ................. 172/558–561, 172/66, 39, 847, 714, 715, 608; 15/256.5, 256.52, 236.1; 280/855, 856, 158.1; 111/134

[56] References Cited

U.S. PATENT DOCUMENTS

| | | | |
|---|---|---|---|
| 272,447 | 2/1883 | Lippy et al. | 280/855 |
| 688,785 | 11/1901 | Unbehend | 280/158.1 |
| 1,321,040 | 11/1919 | Hoffman | 172/559 |
| 1,482,326 | 1/1924 | Sponsler | 280/855 |
| 1,808,861 | 6/1931 | Pagaard | 280/855 |
| 2,494,039 | 1/1950 | Feather | 280/855 |
| 2,582,199 | 1/1952 | Gardner et al. | 172/547 |
| 3,583,555 | 6/1971 | Karsnak | 15/256.5 |
| 4,603,746 | 8/1986 | Swales . | |
| 4,974,406 | 12/1990 | Russ | 172/547 |
| 5,065,681 | 11/1991 | Hadley . | |
| 5,081,942 | 1/1992 | Clark et al. . | |
| 5,269,380 | 12/1993 | Lofquist et al. . | |

Primary Examiner—Randolph A. Reese
Assistant Examiner—Spencer Warnick

[57] ABSTRACT

A grain drill row unit includes a furrow opening device that opens a furrow into which seeds are deposited as the machine advances, and a combination gauge and press wheel rides along the ground behind the furrow opening device to firm the soil around the seed and to control the depth at which the furrow opening device operates. A paddle type scraping wheel is rotatably mounted on a support above the gauge wheel axis, the scraper wheel having edges at the outer ends of the paddles, generally parallel to the axis of the scraper wheel but angled relative to the axis of the gauge wheel, the scraper wheel edges engaging material on the periphery of the gauge wheel and being rotated by contact with said material so that the scraper wheel edges scrape the periphery of the gauge wheel.

6 Claims, 2 Drawing Sheets

SCRAPER FOR PLANTING MECHANISM GAUGE WHEEL

BACKGROUND OF THE INVENTION

This invention relates to an agricultural planting machine, and more particularly to an improved scraping device for removing soil and other material that might build up on the periphery of a gauge wheel that controls the depth of planting for the machine.

In an agricultural planting machine such as a grain drill, the machine includes a number of closely spaced row units respectively adapted to plant a row of seeds as the machine advances, each row unit including a device for opening a furrow into which seed is delivered. In such machines, it is well known to provide a press wheel behind each furrow opening device and behind the location where the seed is deposited in the furrow to press soil around the seed in the furrow. A mechanism of the above general type is disclosed in U.S. Pat. No. 5,065,681, which is also assigned to the assignee herein. It is also known to have the press wheel also function as a gauge wheel that controls the depth of penetration of the furrow opening device, and it is also known to provide for an adjustment so that the position of the gauge wheel relative to the furrow opening device can be varied to vary the depth that the seed is planted, such an adjustable gauge wheel being shown in U.S. Pat. No. 5,081,942, which is also assigned to the assignee herein.

One of the problems associated with such devices is that in certain field and soil conditions, mud and crop residue can build up on the periphery of the gauge wheel, which of course increases the effective diameter of the wheel. The change in effective diameter of the gauge wheel then affects the operating depth of the furrow opening device and therefor can result in a furrow that is too shallow.

To prevent such a build up, it is known to provide a scraping device adjacent the periphery of the gauge wheel to clean the material from the wheel as it rotates. However, such devices heretofore have comprised some type of rigid blade, which have not been satisfactory in that after material builds up on the wheel the blade tends to act as a brake for the wheel, so that the wheel stops turning and drags along the ground rather than rolling as it should. This, of course, affects the proper placement of the seed.

BRIEF SUMMARY OF THE INVENTION

According to the present invention, an improved scraping device is provided for a gauge wheel of the above general type, wherein the scraping device will not interfere with the rotation of the gauge wheel. More specifically, a paddle type wheel is provided adjacent the periphery of the gauge wheel, the wheel type scraper being rotated by contact with any material that builds up on the periphery of the gauge wheel.

A feature of the invention resides in the fact that the paddle type scraper wheels are provided with edges on their outer periphery generally parallel with the axis of the scraper wheels. Another feature of the invention resides in the fact that the axis of the scraper wheel is inclined to a significant degree from the axis of the gauge wheel, so that the scraper wheel edges perform a scraping or scrubbing function on the periphery of the gauge wheel.

Still another feature of the invention resides in the simple and inexpensive construction of the gauge wheel scraping device.

DETAILED DESCRIPTION OF THE DRAWINGS

Figure 1:
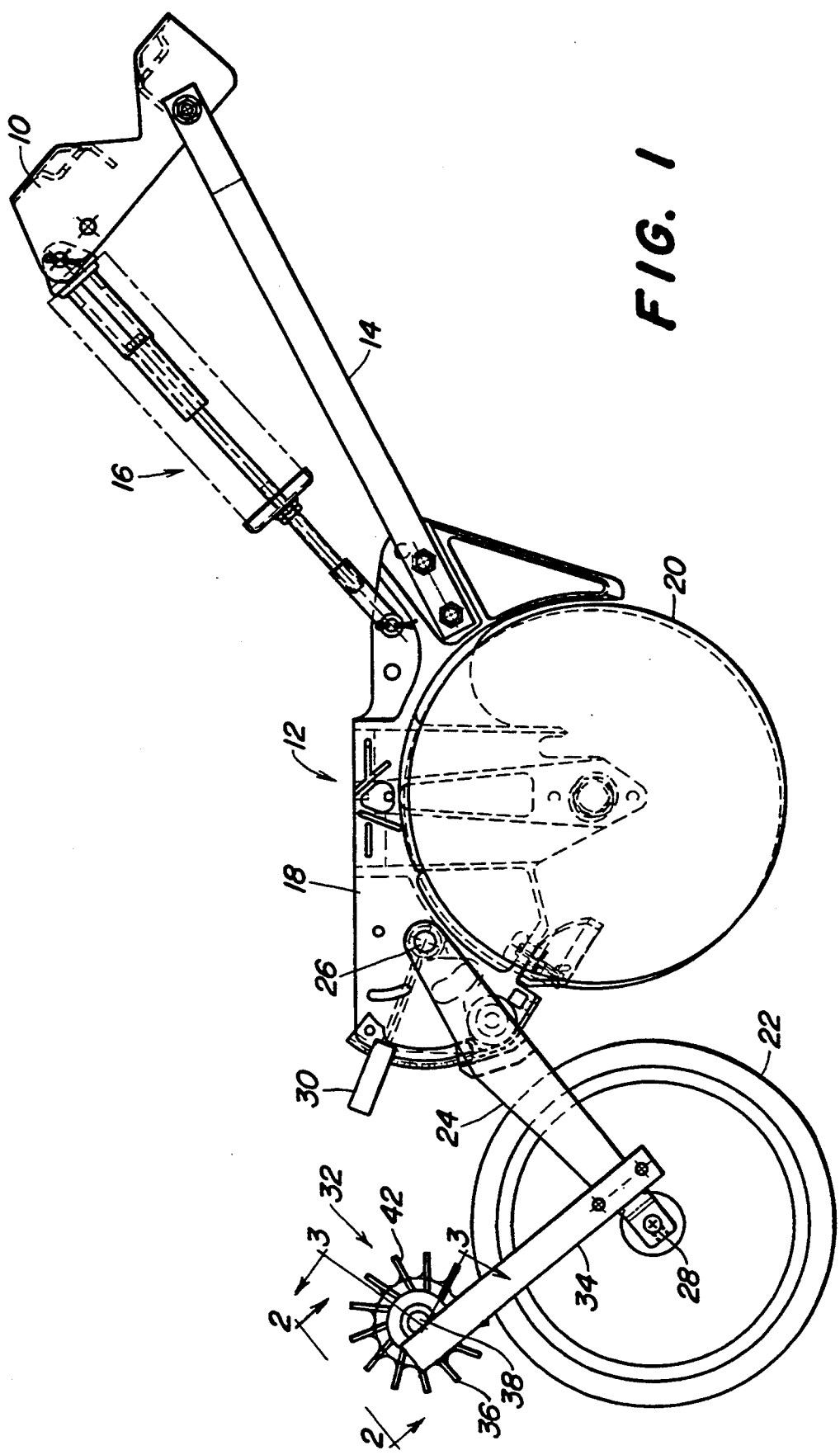
FIG. 1 is a side elevation view of a grain drill row unit with the improved paddle type scraper wheel operating adjacent to the gauge and press wheel.

The invention is embodied in an agricultural planting machine of the type known as a grain drill. The grain drill includes a mobile main frame 10, only a small portion of which is shown in FIG. 1. The overall construction of a typical grain drill is shown in greater detail in the above mentioned U.S. Pat. No. 5,065,681. The grain drill includes a plurality of row units 12 mounted side by side on the grain drill, with each row unit being adapted to deposit a single row of seed in the ground as the machine advances, only a single row unit 12 being illustrated herein. The row unit 12 is supported on the grain drill mainframe 10 by a generally fore and aft linkage 14 and a down pressure mechanism 16 that is generally parallel to the link 14 and acts to control the down pressure on the row unit as described in greater detail in said U.S. Pat. No. 5,065,681.

Each row unit 12 includes a frame 18 that supports a furrow opening device 20, here a pair of disks that diverge slightly toward the rear and enter the ground so that the disks form a furrow as the machine advances. A seed delivery system (not shown) delivers seed into the furrow adjacent the rear side of the furrow opening disks 20, and, as is also well known, the grain drill includes seed metering mechanisms for delivering the seed to the seed delivery system.

A combination press and gauge wheel 22 trails the furrow opening device rearwardly of the point of deposit of the seed and acts to firm the ground around the seed while also controlling the depth of penetration of the furrow opening disk. The press and gauge wheel 22 is attached to the row unit frame 18 by a downwardly and rearwardly inclined arm 24 having its forward end attached to the frame 18 by a transverse pivot 26 and carrying a transverse shaft 28 at its rearward end that journals the press and gauge wheel 22. The row unit 12 is shown in FIG. 1 in its raised, non-operating position wherein the furrow opening disk are out of the ground. In operation, as the row unit is lowered, the press and gauge wheel 22 swings upwardly about the pivot 26 until the arm 24 engages an adjustable stop 30. As is apparent, the position of the stop controls the lowermost position of the furrow opening disk since the wheel 22 rides on the top of the ground. The depth adjustment mechanism as described in greater detail in the above described U.S. Pat. No. 5,081,942.

Figure 2:
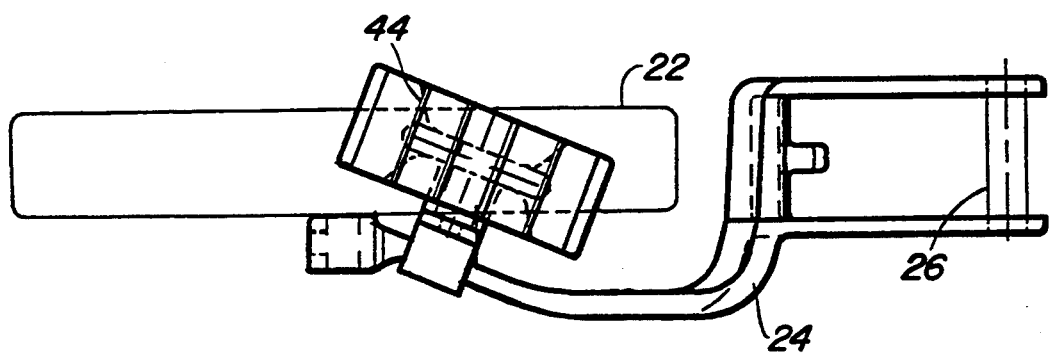
FIG. 2 is a plan view of the gauge and press wheel and the scraper wheel as viewed along the line 2—2 of FIG. 1.
Figure 3:
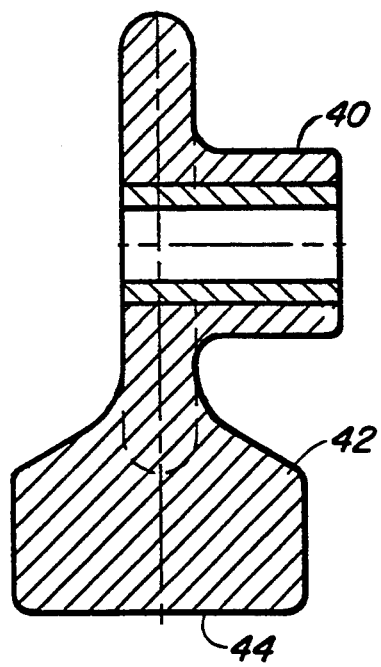
FIG. 3 is an enlarged section view of the paddle type scraper wheel as viewed generally along the line 3—3 of FIG. 1.

Since the relationship between the gauge wheel 22 and the furrow opening disk controls the depth of the furrow and consequently the depth that the seed is planted, it is important that the diameter of the gauge wheel 22 be constant. Since a build up of sticky soil or crop residue on the periphery of the wheel in some conditions would change the effective diameter of the gauge wheel 22, a press wheel scraping device, indicated in its entirety by the numeral 32, is provided adjacent the upper portion of the gauge wheel to clean the material off the gauge wheel periphery. The press wheel scraper 32 includes a generally vertical support 34 having its lower end attached to the gauge wheel arm 24 immediately in front of the shaft 28. The support 34 is inclined upwardly and rearwardly from the arm 24 and supports a paddle type scraper wheel 36 via a shaft 38 supported on the upper end of the support 34. As best seen in FIG. 2, the axis of the shaft 38 is inclined at an acute angle relative to the axis of the gauge wheel shaft 28, the angle of inclination in the illustrated embodiment being approximately 22 1/2°.

The scraper wheel 36 includes a hub 40 with a number of generally radially extending paddles 42 projecting outwardly from the hub 40. As is apparent from FIG. 1, each paddle is not exactly radial, and, in the illustrated embodiment, 12 equally spaced paddles are provided. Each paddle forms an outer edge 44 that is located on the periphery of the scraper wheel, and, as is shown in FIG. 2, each edge is generally parallel to the axis of the scraper wheel shaft 38, so that the edges 44 are also inclined relative to the axis of rotation of the gauge wheel 22. As is apparent, the scraper wheel 32 is positioned so that its outer periphery is adjacent to the outer periphery of the gauge wheel so that the scraper wheel is driven by contact with any material that accumulates on the gauge wheel. As is also apparent, the resulting rotation of the scraper wheel tends to remove foreign material from the periphery of the gauge wheel.

We claim:

1. In an agricultural planting machine having a plurality of row units that include a row unit frame, furrowing opening device mounted on the frame and a depth gauging wheel rotatably mounted on a transverse shaft rearwardly of the opening device, the shaft being supported on an arm connected to the frame, the combination therewith of an improved scraping device for at least one of the gauge wheels, comprising:

a support member mounted on the arm;

a scraper wheel rotatably mounted on the support member for rotation about an axis offset from the axis of the gauge wheel, the scraper wheel including a plurality of edges on its periphery that are non-parallel to the gauge wheel axis and adjacent the periphery of the gauge wheel so that the scraper wheel rotates by contact with any material on the periphery of the gauge wheel and the edges scrape said material from the gauge wheel periphery.

2. The invention described in claim 1 wherein the scraper wheel includes a plurality or generally radial paddles and the edges are disposed on the outer ends of the paddles.

3. The invention described in claim 1 wherein the axis of the scraper wheel is located above and rearwardly of the axis of the gauge wheel.

4. The invention described in claim 1 wherein the edges of the scraper wheel are generally parallel to the scraper wheel axis.

5. The invention described in claim 4 wherein the axis of the scraper wheel is generally horizontal and inclined at an angle between 15° and 30° from a horizontal transverse line.

6. The invention described in claim 1 wherein the axis of the scraper wheel is generally horizontal and inclined at an angle between 15° and 30° from a horizontal transverse line.

* * * * *